United States Patent
Adiraju et al.

(10) Patent No.: US 10,442,395 B2
(45) Date of Patent: Oct. 15, 2019

(54) ANCHOR BRACKET INCLUDING BOTH A SEATBELT WEBBING ATTACHMENT PORTION AND A CARGO SECUREMENT ATTACHMENT PORTION

(71) Applicant: Ford Global Technologies, LLC, Dearborn, MI (US)

(72) Inventors: Sri Adiraju, Novi, MI (US); Edward Joseph DeSmet, Jr., Canton, MI (US); Jeffrey Gabalski, West Bloomfield, MI (US); Richard Moss, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 72 days.

(21) Appl. No.: 15/834,361

(22) Filed: Dec. 7, 2017

(65) Prior Publication Data
US 2019/0176750 A1    Jun. 13, 2019

(51) Int. Cl.
*B60R 22/22* (2006.01)
*B60R 22/26* (2006.01)
*B60R 7/04* (2006.01)

(52) U.S. Cl.
CPC ............... *B60R 22/22* (2013.01); *B60R 7/04* (2013.01); *B60R 7/043* (2013.01); *B60R 22/26* (2013.01); *B60R 2022/266* (2013.01)

(58) Field of Classification Search
CPC ............ B60R 22/22; B60R 7/04; B60R 7/043
See application file for complete search history.

(56) References Cited

U.S. PATENT DOCUMENTS

| 4,272,104 | A | * | 6/1981 | Cuny | A44B 11/2546 280/801.1 |
| 5,332,261 | A | * | 7/1994 | Siepierski | B60R 22/22 280/801.1 |
| 5,641,254 | A | | 6/1997 | Sullivan | |
| 5,752,719 | A | * | 5/1998 | Mitschelen | B60N 2/90 280/801.1 |
| 5,855,047 | A | * | 1/1999 | Haas | B60R 22/22 24/684 |
| 6,116,649 | A | * | 9/2000 | Compton | B60R 22/02 280/749 |
| 6,749,241 | B1 | | 6/2004 | Erlandsson et al. | |
| 7,651,134 | B2 | | 1/2010 | Rosso | |

(Continued)

*Primary Examiner* — Drew J Brown
(74) *Attorney, Agent, or Firm* — Vichit Chea; Price Heneveld LLP

(57) ABSTRACT

A vehicle comprising a floor portion; a row of seating; and a first anchor bracket including: a seatbelt webbing attachment portion to which a first seatbelt webbing, configured to secure an occupant to the row of seating, is attached; and a cargo securement attachment portion to which a cargo securement device, configured to secure one or more pieces of cargo above the floor portion adjacent the row of seating, is attached. The vehicle can further include a second anchor bracket including a seatbelt webbing attachment portion to which a second seatbelt webbing, configured to secure an occupant to the row of seating, is attached, and a cargo securement attachment portion to which the cargo securement device is attached. The first anchor bracket and second anchor bracket can be identically shaped and interchangeable during assembly of the vehicle. The first anchor bracket and second anchor bracket can be shaped differently.

20 Claims, 22 Drawing Sheets

(56) References Cited

U.S. PATENT DOCUMENTS

| | | | |
|---|---|---|---|
| 7,766,422 B2 | 8/2010 | Edwards et al. | |
| 2009/0278394 A1* | 11/2009 | Itoga | B60R 21/18 |
| | | | 297/468 |
| 2015/0115588 A1* | 4/2015 | Storck | B60R 22/26 |
| | | | 280/801.1 |

* cited by examiner

ANCHOR BRACKET INCLUDING BOTH A SEATBELT WEBBING ATTACHMENT PORTION AND A CARGO SECUREMENT ATTACHMENT PORTION

FIELD OF THE INVENTION

The present invention generally relates to an anchor bracket, to anchor a seatbelt webbing and a cargo securement device, for use in relation to a row of seating in a vehicle.

BACKGROUND OF THE INVENTION

Vehicles sometimes include multiple rows of seating within an interior of the vehicle, including a second row of seating rearward of a first row of seating. An anchor bracket is sometimes utilized to anchor a seatbelt webbing, which is used to secure an occupant of the row of seating to the row of seating. One or more pieces of cargo might be placed adjacent to the row of seating, such as on a floor portion in front of or below the row of seating, but vehicles typically do not provide a mechanism to secure the one or more pieces of cargo.

SUMMARY OF THE INVENTION

According to a first aspect of the present invention, a vehicle comprises a floor portion; a row of seating; and a first anchor bracket including: a seatbelt webbing attachment portion to which a first seatbelt webbing, configured to secure an occupant to the row of seating, is attached; and a cargo securement attachment portion to which a cargo securement device, configured to secure one or more pieces of cargo above the floor portion adjacent the row of seating, is attached.

Embodiments of the first aspect of the invention can include any one or a combination of the following features:

- a second anchor bracket including a seatbelt webbing attachment portion to which a second seatbelt webbing, configured to secure an occupant to the row of seating, is attached, and a cargo securement attachment portion to which the cargo securement device is attached;
- the first anchor bracket is disposed adjacent a first side of the row of seating;
- the second anchor bracket is disposed adjacent a second side of the row of seating;
- the first anchor bracket is disposed adjacent a seat portion at the first side of the row of seating;
- the second anchor bracket is disposed adjacent the seat portion at the second side of the row of seating;
- the first anchor bracket is connected to a first riser, which is attached to the floor portion and disposed beneath the seat portion, at the first side of the row of seating, elevating the seat portion above the floor portion;
- the second anchor bracket is connected to a second riser, which is attached to the floor portion and disposed beneath the seat portion, at the second side of the row of seating, elevating the seat portion above the floor portion;
- the first anchor bracket comprising a support attachment section including one or more apertures, configured to allow one or more fasteners to project through the one or more apertures and one or more matching apertures of the first riser to allow the connection of the first anchor bracket to the first riser;
- the second anchor bracket comprising a support attachment section including one or more apertures, configured to allow one or more fasteners to project through the one or more apertures and one or more matching apertures of the second riser to allow the connection of the second anchor bracket to the second riser;
- the seatbelt webbing attachment portion and the cargo securement attachment portion of the first anchor bracket extend from the support attachment section of the first anchor bracket;
- the seatbelt webbing attachment portion and the cargo securement attachment portion of the second anchor bracket extend from the support attachment section of the second anchor bracket;
- the first anchor bracket and the second anchor bracket are identically shaped;
- the first anchor bracket and the second anchor bracket are shaped differently and are not interchangeable;
- the seatbelt webbing attachment portion and the cargo securement attachment portion of the first anchor bracket extend generally orthogonally from the support attachment section;
- the seatbelt webbing attachment portion and the cargo securement attachment portion of the second anchor bracket extend generally orthogonally from the support attachment section;
- the seatbelt webbing attachment portion of the first anchor bracket generally opposes the cargo securement attachment portion;
- the seatbelt webbing attachment portion of the second anchor bracket generally opposes the cargo securement attachment portion;
- the cargo securement attachment portion of the first anchor bracket is disposed forward of the seatbelt webbing attachment portion; and
- the cargo securement attachment portion of the second anchor bracket is disposed forward of the seatbelt webbing attachment portion.

According to a second aspect of the present invention, a method of securing cargo on a floor portion of a vehicle comprises: presenting the vehicle according to the first aspect of the present invention described above; placing one or more pieces of cargo above the floor portion adjacent the row of seating; securing the cargo securement device adjacent the one or more pieces of cargo to restrain movement of the one or more pieces of cargo while the vehicle is moving; and moving the vehicle.

Embodiments of the second aspect of the invention can include any one or a combination of the following features:

- securing an occupant on the row of seating with the first seatbelt webbing attached to the seatbelt webbing attachment portion of the first anchor bracket; and
- unsecuring the one or more pieces of cargo and removing the one or more pieces of cargo from the vehicle before securing the occupant on the row of seating.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
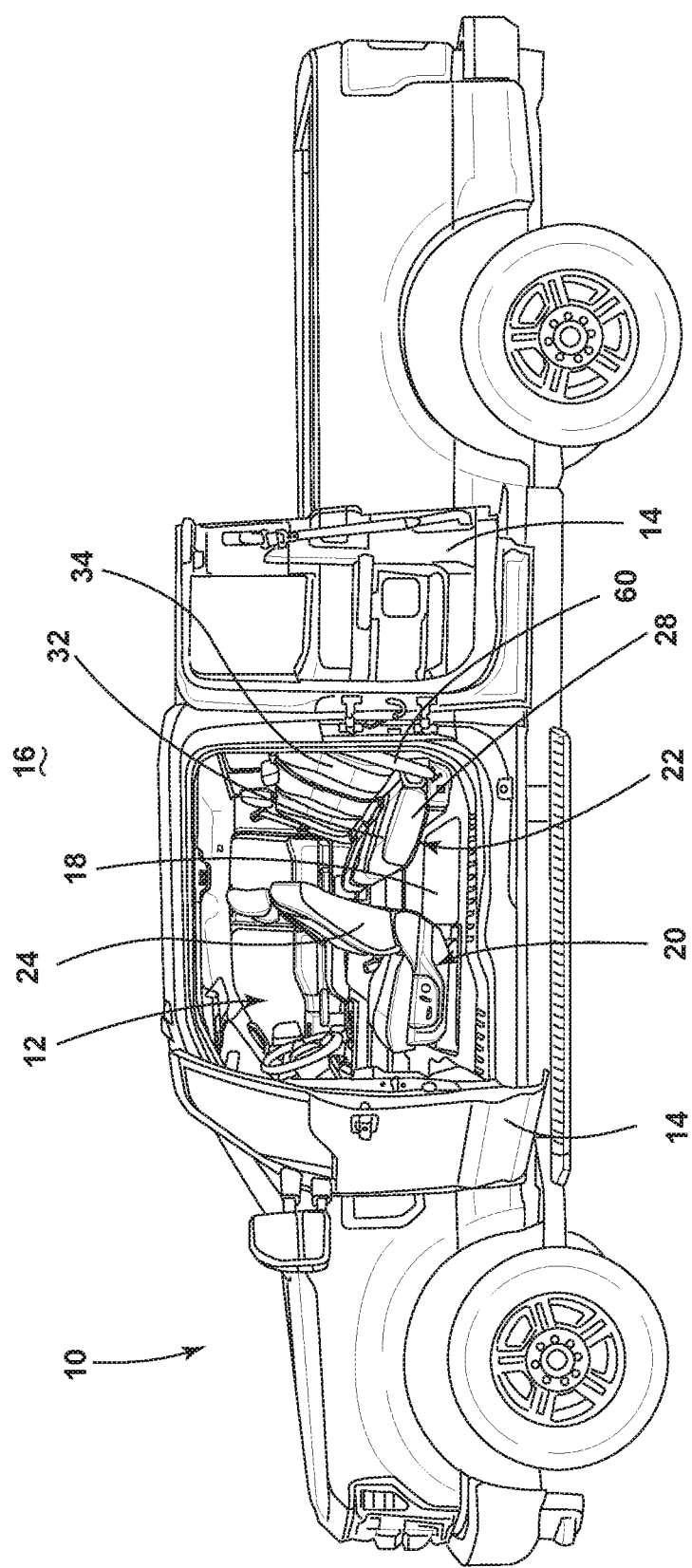
FIG. 1 is a side view of a vehicle, illustrating an interior including a second row of seating rearward of a first row of seating.

For purposes of description herein, the terms "rearward," "above," "forward," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
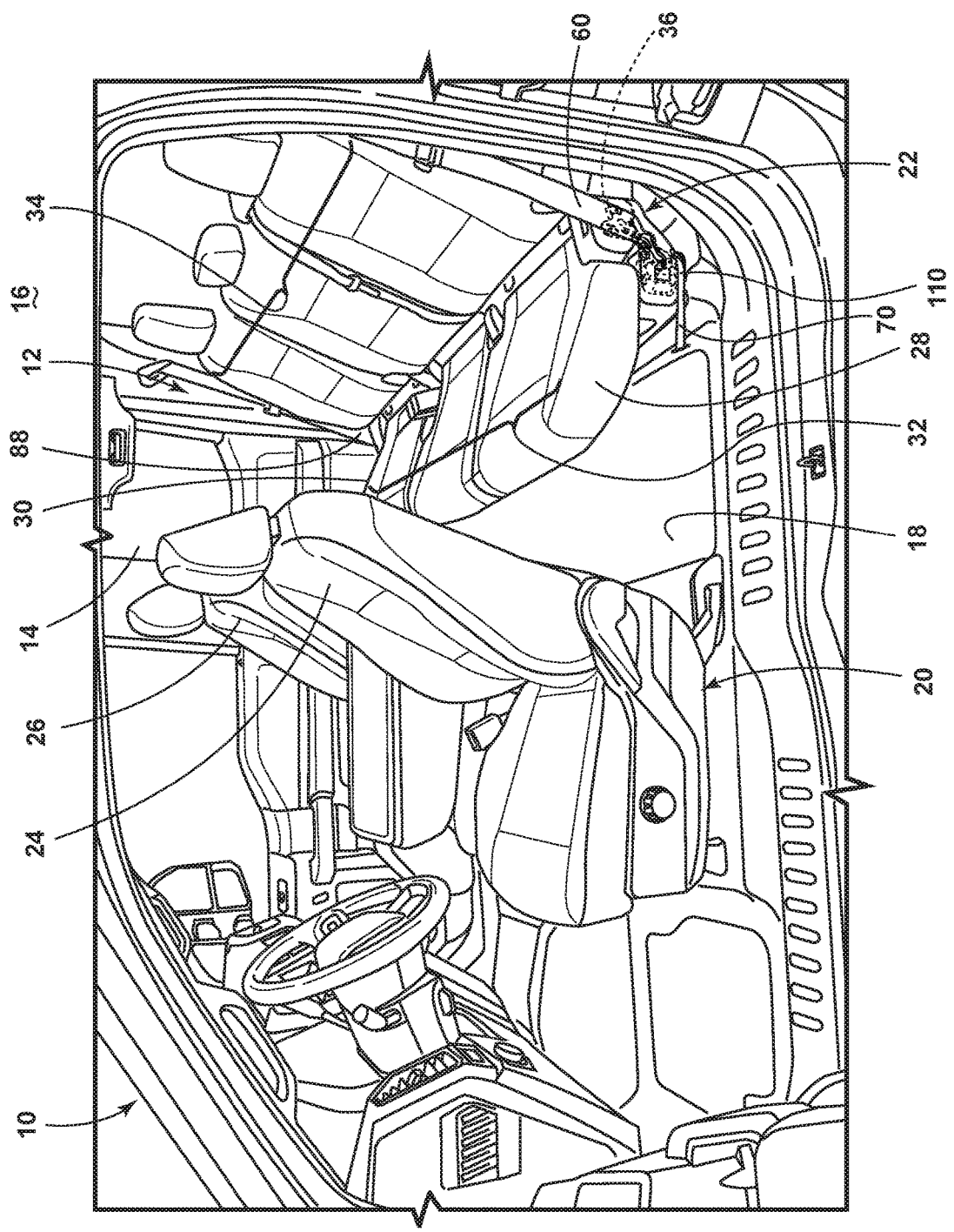
FIG. 2 is a side view of the interior of FIG. 1, illustrating a first riser at a first side of the second row of seating raising a seat portion of the second row of seating above a floor portion of the vehicle.

Referring to FIGS. 1 and 2, a vehicle 10 is illustrated, which can be a truck, van, sports utility vehicle, car, or any other type of passenger automobile. The vehicle 10 includes an interior 12 and one or more doors 14 separating the interior 12 from an exterior 16. Within the interior 12, the vehicle 10 includes a floor portion 18 supporting a first row of seating 20 and a second row of seating 22 rearward of the first row of seating 20. The vehicle 10 can further include a third row of seating (not illustrated) rearward of the second row of seating 22 and subsequent rows of seating rearward of the third row of seating. The second row of seating 22 can be one generally contiguous seating area, as illustrated, or be comprised of several individual separated seating assemblies. The first row of seating 20, for example, includes individual separated seating assemblies 24, 26. The second row of seating 22 includes a first side 28 and a second side 30 on the opposite side of the second row of seating 22 as the first side 28. For example, the first side 28 of the second row of seating 22 can be generally rearward of seating assembly 24 of the first row of seating 20, which can be designated for an operator of the vehicle 10. The second side 30 of the second row of seating 22 can be generally rearward of seating assembly 26 of the first row of seating 20, which can be designated for a passenger of the vehicle 10. The second row of seating 22 includes a seat portion 32 and a seatback portion 34.

Referring now generally to FIGS. 3A-16, the vehicle 10 further includes a first riser 36 and a second riser 38. Both the first riser 36 and the second riser 38 are attached to the floor portion 18. For example, the first riser 36 can include one or more floor attachment portions 40a, 40b (see particularly FIG. 5), which can contact and sit upon the floor portion 18. The floor attachment portions 40a, 40b can be generally flat areas that are planar with the opposing floor portion 18. Each of the one or more floor attachment portions 40a, 40b can include an aperture 42. The apertures 42 allow a fastener (not illustrated) to attach the first riser 36 to a cooperating aperture (not illustrated) of the floor portion 18. The second riser 38 can likewise one or more include floor attachment portions 44a, 44b (see particularly FIG. 9) with apertures 46 for the same attachment purposes.

Figure 3A:
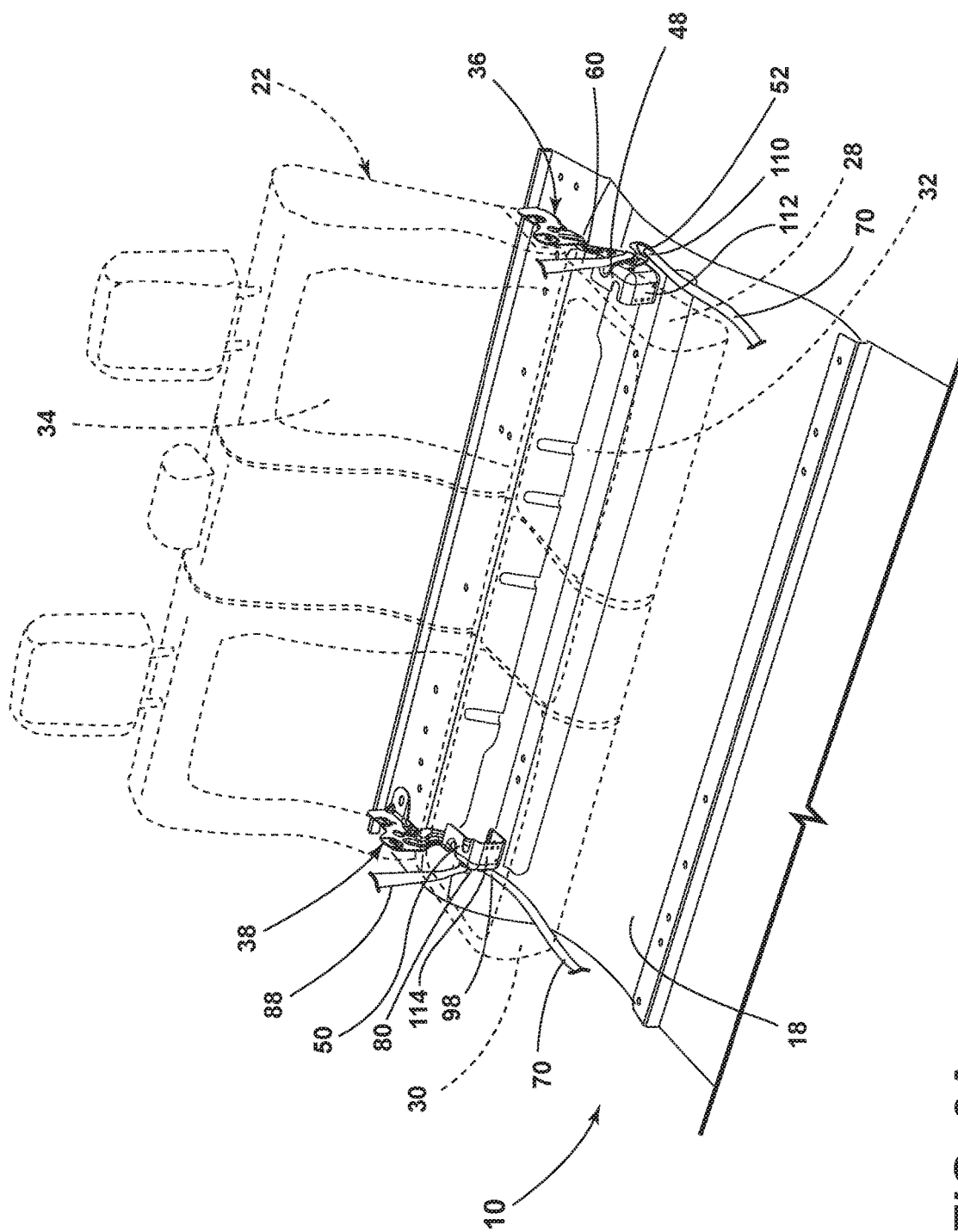
FIG. 3A is a perspective view of the second row of seating of FIG. 1, illustrating a first anchor bracket attached to the first riser.
Figure 3B:
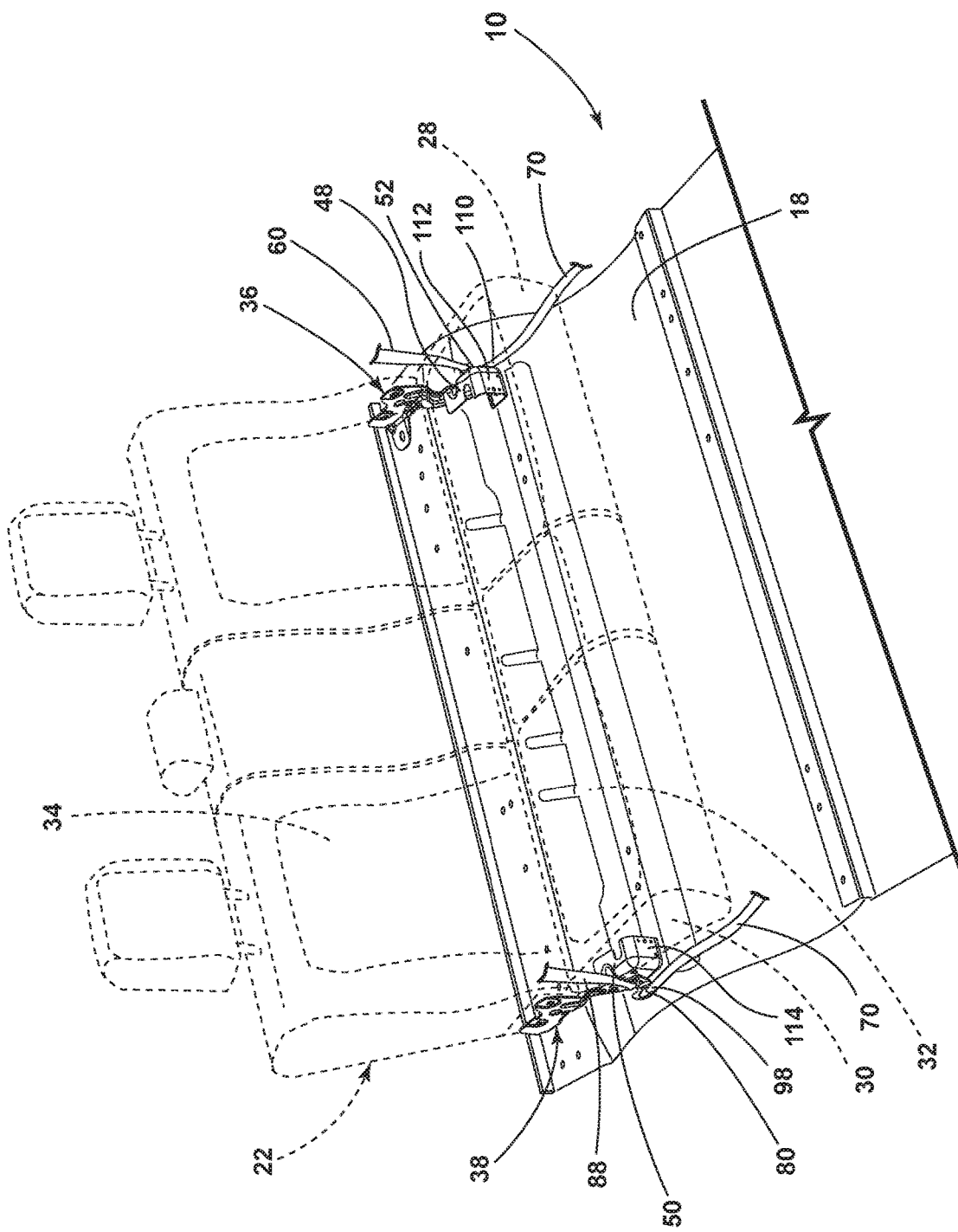
FIG. 3B is a perspective view of the second row of seating of FIG. 1, illustrating a second anchor bracket attached to a second riser, which is disposed at a second side of the second row of seating and raises the seat portion of the second row of seating above the floor portion of the vehicle.
Figure 4:
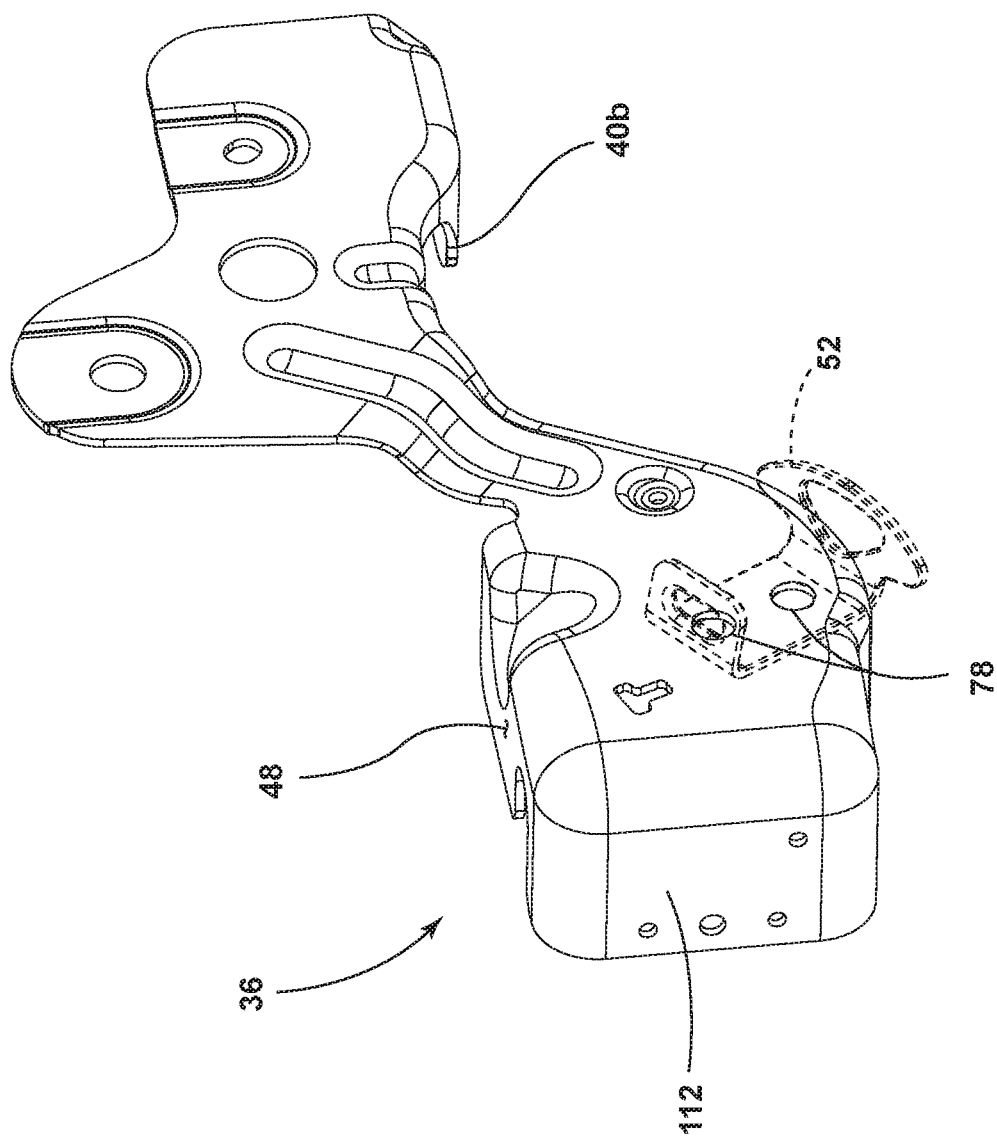
FIG. 4 is a perspective view of the first riser of FIG. 2, illustrating a support surface to support the seat portion of the second row of seating and apertures to allow the attachment of the first anchor bracket to the first riser.

Both the first riser 36 and the second riser 38 are further disposed beneath the seat portion 32 of the second row of seating 22, to support and elevate the seat portion 32 above the floor portion 18 (see particularly FIGS. 3A and 3B). For example, the first riser 36 can include a support surface 48 (see particularly FIG. 4), upon which the seat portion 32 is supported. The support surface 48 can be disposed above the floor attachment portion 40a. The second riser 38 can likewise include a similarly situated support surface 50 (see particularly FIG. 8) to support and elevate the seat portion 32 above the floor portion 18. The first riser 36 is disposed at and supports the seat portion 32 at the first side 28 of the second row of seating 22. The second riser 38 is disposed at and supports the seat portion 32 at the second side 30 of the second row of seating 22. Both the first riser 36 and the second riser 38 can include forward ends 112 and 114, respectively.

Figure 5:
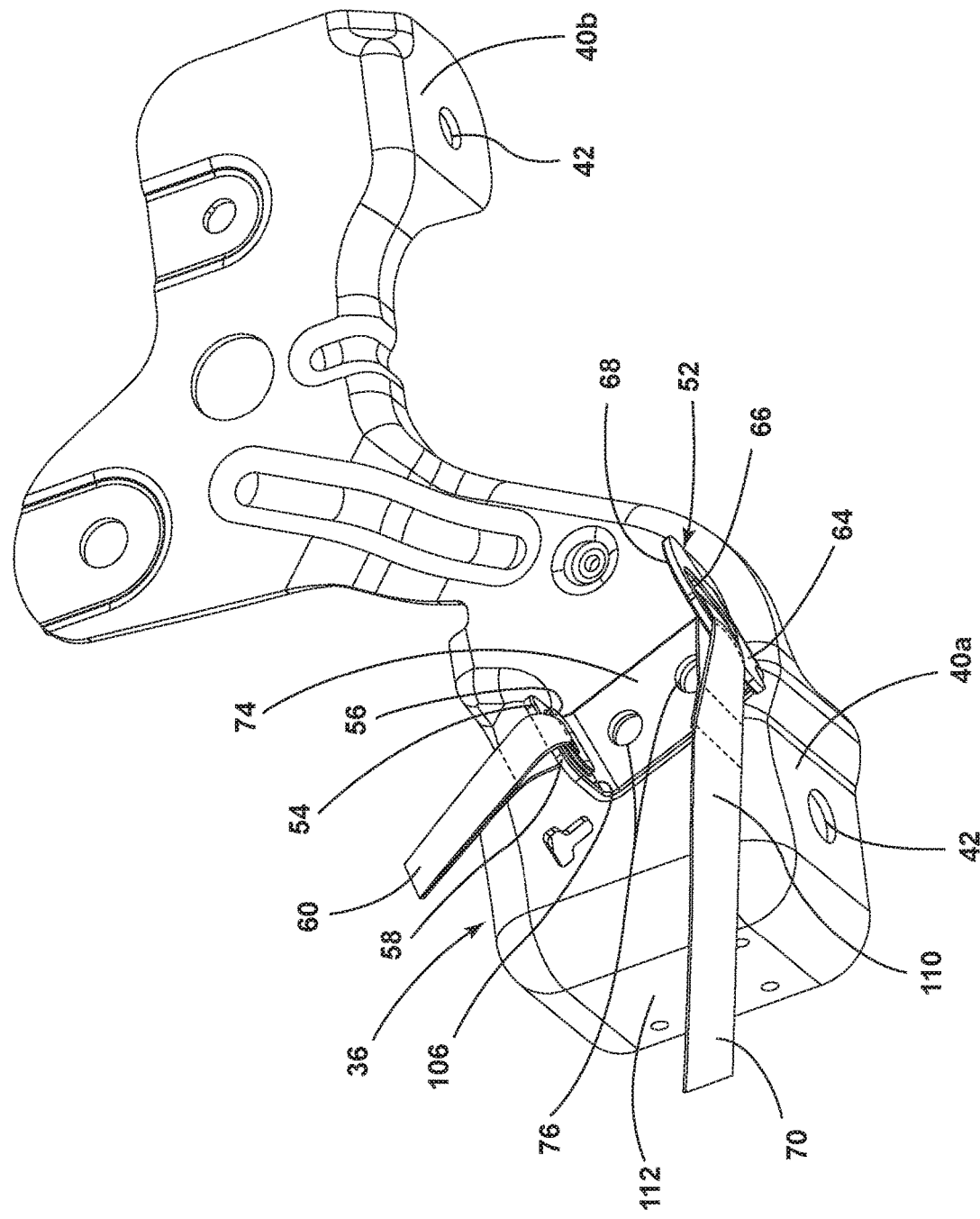
FIG. 5 is a perspective view of the first riser of FIG. 2, illustrating the first anchor bracket attached thereto, and a first seatbelt webbing and a cargo securement device both attached to the first anchor bracket.

The vehicle 10 further includes a first anchor bracket 52 (see, e.g., FIGS. 3A and 5). The first anchor bracket 52 can be disposed at or near the first side 28 of the second row of seating 22, more particularly the seat portion 32. The first anchor bracket 52 includes a seatbelt webbing attachment portion 54 (see, e.g., FIGS. 6 and 7). The seatbelt webbing attachment portion 54 can include an aperture 56 through the seatbelt webbing attachment portion 54, forming an arm 58. A first seatbelt webbing 60 can be attached to the seatbelt webbing attachment portion 54, such as by placing the first seatbelt webbing 60 through the aperture 56, wrapping it around the arm 58, and attaching the first seatbelt webbing 60 to itself (such as by sewing). The first seatbelt webbing 60 can be utilized to secure an occupant 62 (see FIG. 20) to the second row of seating 22.

Figure 6:
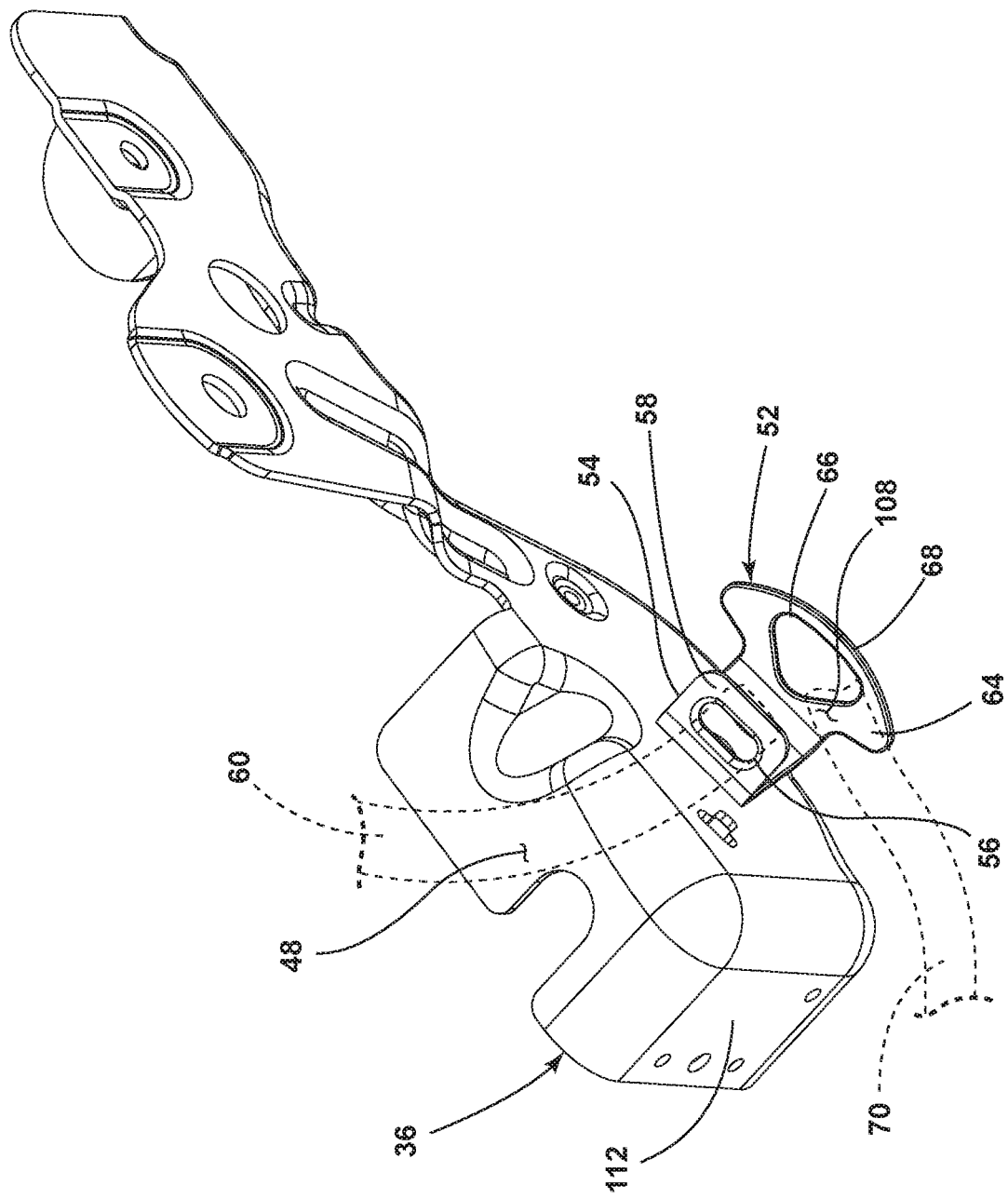
FIG. 6 is an overhead perspective view of the first riser of FIG. 2 with the first anchor bracket attached thereto.
Figure 7:
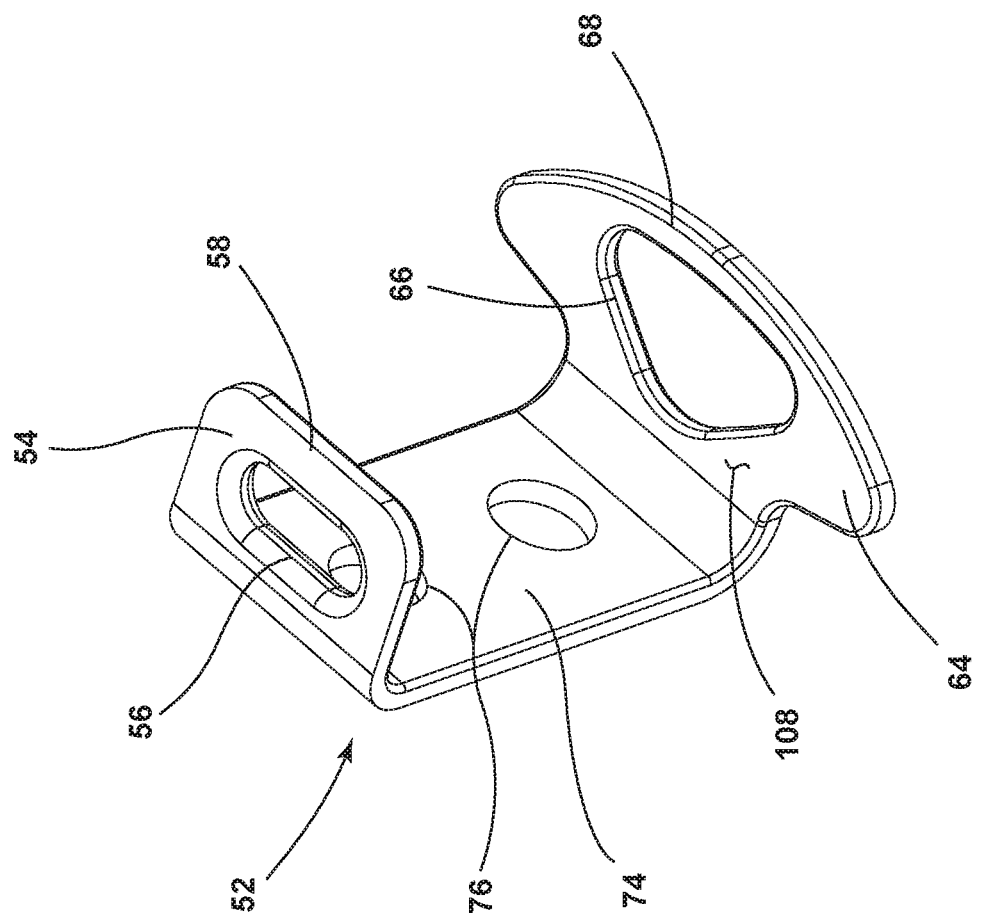
FIG. 7 is a perspective view of the first anchor bracket of FIGS. 3A, 5, and 6, illustrating a seatbelt webbing attachment portion and a cargo securement attachment portion extending from a support attachment section.
Figure 8:
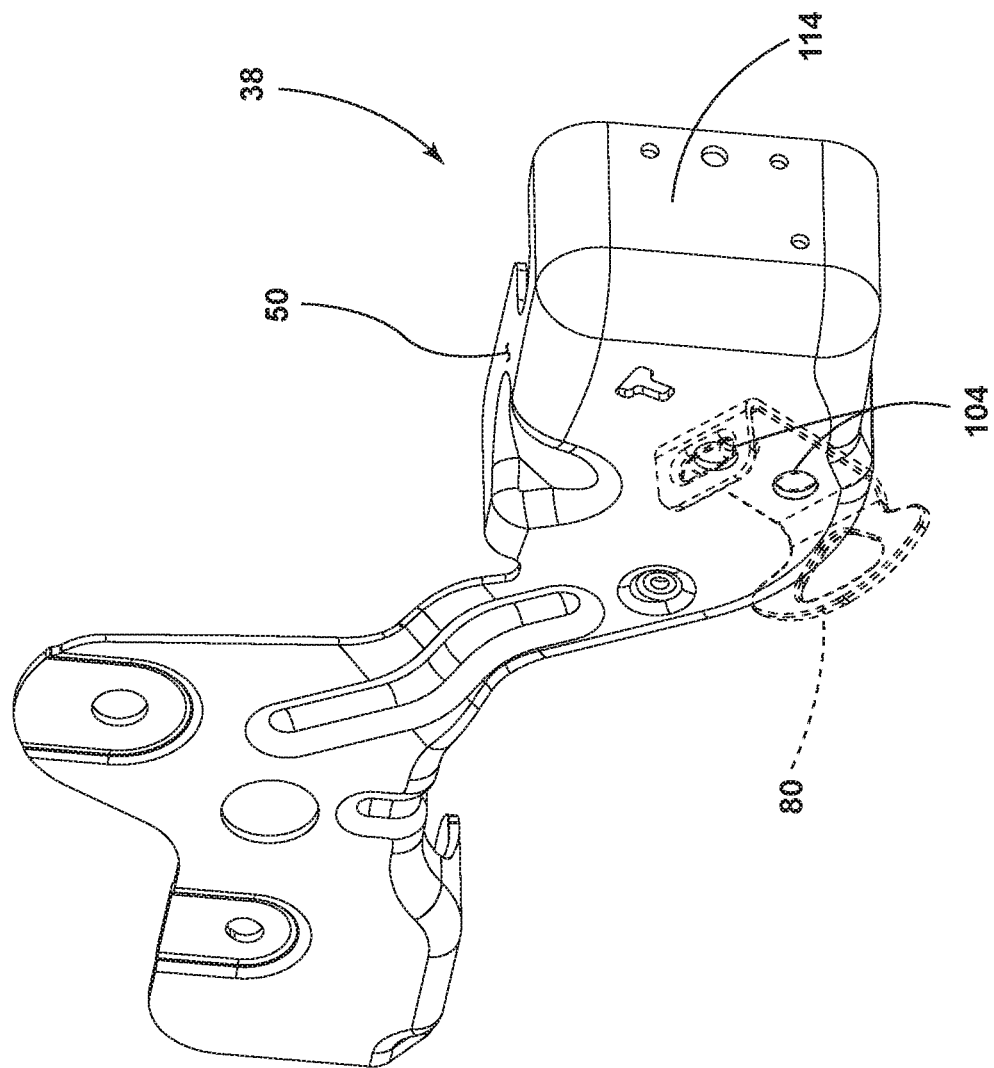
FIG. 8 is a perspective view of the second riser of FIG. 3B, illustrating a support surface to support the seat portion of the second row of seating and apertures to allow the attachment of the second anchor bracket to the second riser.

The first anchor bracket 52 further includes a cargo securement attachment portion 64 (see particularly FIGS. 5-7). The cargo securement attachment portion 64 can include an aperture 66 through the cargo securement attachment portion 64, forming an arm 68. A cargo securement device 70 (see, e.g., FIG. 5), which can be a strap, webbing material, fabric, and the like, can be attached to the cargo securement attachment portion 64. For example, the cargo securement device 70 can be placed through the aperture 66, wrapped around the arm 68, and attached to itself (such as by sewing). As discussed further below, the cargo securement device 70 can be utilized to secure one or more pieces of cargo 72 (see FIGS. 17-20) above the floor portion 18 adjacent the second row of seating 22 (such as under the seat portion 32 and forward of the seatback portion 34). The one or more pieces of cargo 72 can be placed rearward of the first row of seating 20.

In the illustrated embodiments, the first anchor bracket 52 is connected to the first riser 36. For example, the first anchor bracket 52 can include a support attachment section 74 (see particularly FIG. 5). The support attachment section 74 can be generally flat or otherwise matching the contour of the first riser 36 to which the support attachment section 74 faces when attached. The support attachment section 74 include apertures 76, which can match apertures 78 on the first riser 36 (see particularly FIG. 4), allowing fasteners (not illustrated) to connect the first anchor bracket 52 to the first riser 36 via the apertures 76 and the matching apertures 78 of the first riser 36. The seatbelt webbing attachment portion 54 and the cargo securement attachment portion 64 extend from the support attachment section 74. The seatbelt webbing attachment portion 54 and the cargo securement attachment portion 64 can extend outboard, laterally from the support attachment section 74, including generally orthogonally therefrom, as illustrated (see particularly FIG. 11).

The vehicle 10 can further include a second anchor bracket 80 (see particularly FIGS. 3B, 9 and 10) to cooperate with the first anchor bracket 52 in securing the one or more pieces of cargo 72, as discussed further below. The second anchor bracket 80 can be disposed adjacent the second side 30 of the second row of seating 22, more particularly the seat portion 32 thereof. The second anchor bracket 80 includes a seatbelt webbing attachment portion 82. The seatbelt webbing attachment portion 82 can include an aperture 84 through the seatbelt webbing attachment portion 82, forming an arm 86. A second seatbelt webbing 88 can be attached to the seatbelt webbing attachment portion 82, such as by placing the second seatbelt webbing 88 through the aperture 84, wrapping it around the arm 86, and attaching the second seatbelt webbing 88 to itself (such as by sewing). The second seatbelt webbing 88 can be utilized to secure another occupant 90 (see FIG. 20) to the second row of seating 22.

Figure 9:
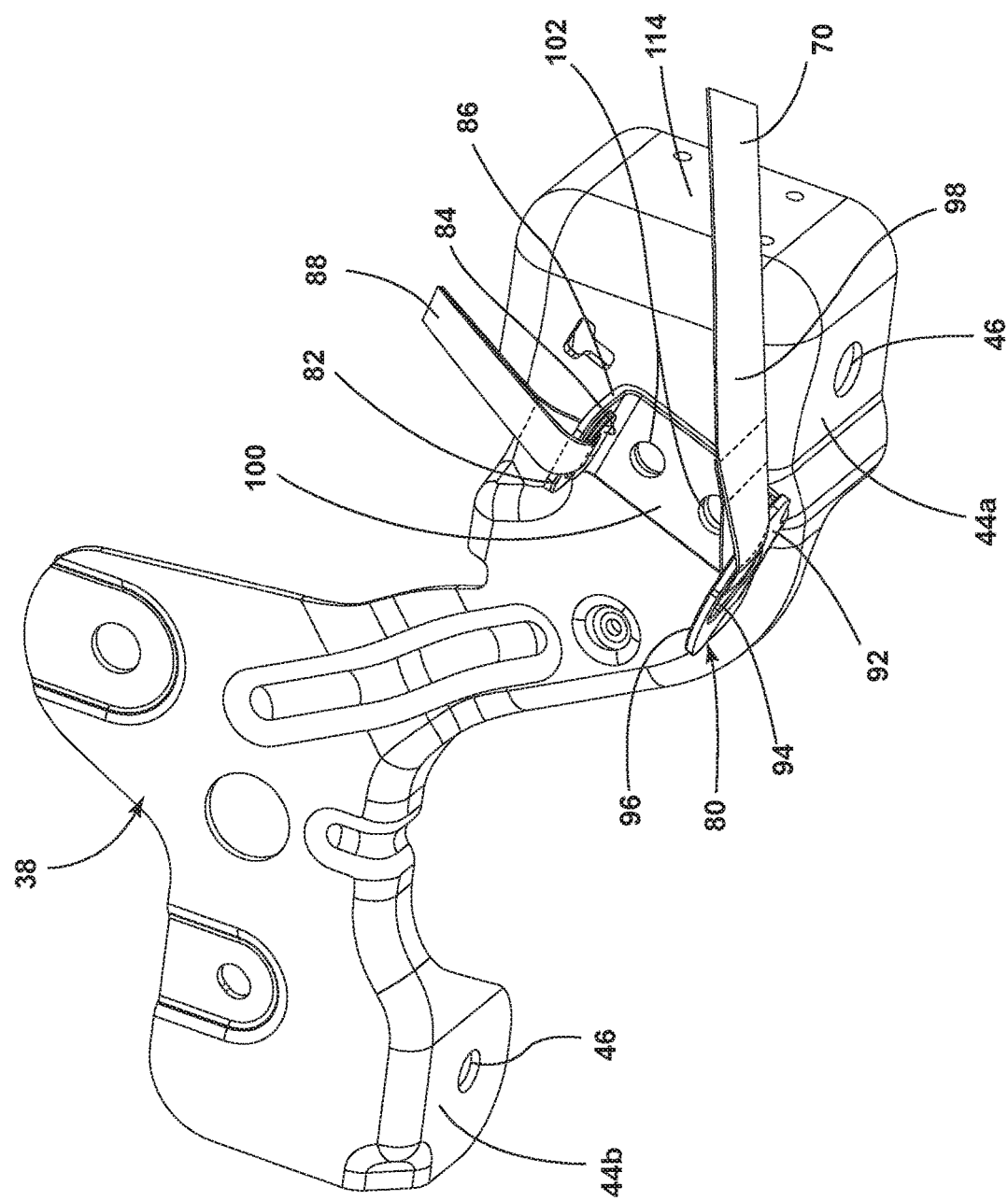
FIG. 9 is a perspective view of the second riser of FIG. 3B, illustrating the second anchor bracket attached thereto, and a second seatbelt webbing and the cargo securement device both attached to the second anchor bracket.
Figure 10:
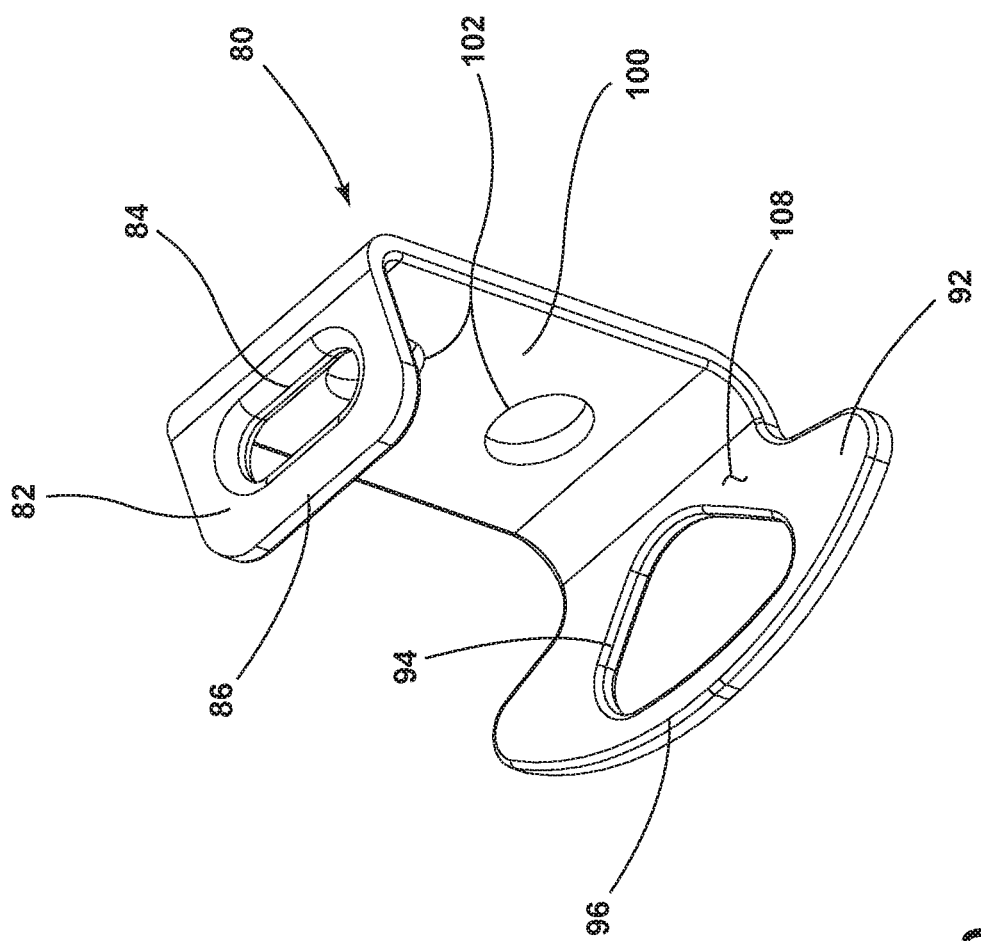
FIG. 10 is a perspective view of the second anchor bracket of FIGS. 3B and 9, illustrating a seatbelt webbing attachment portion and a cargo securement attachment portion extending from a support attachment section.
Figure 11:
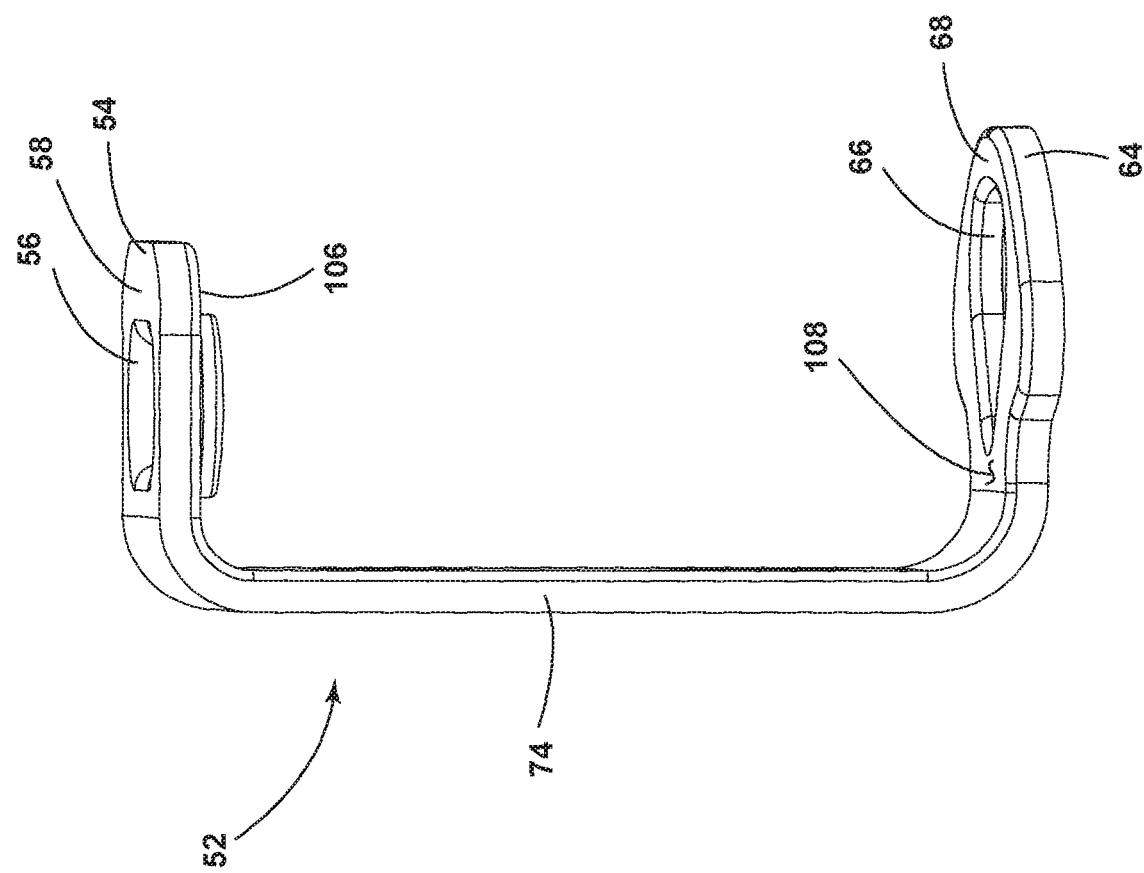
FIG. 11 is a side view of the first anchor bracket of FIG. 3A, illustrating an inside facing surface of the seatbelt webbing attachment portion opposing an inside facing surface of the cargo securement attachment portion.
Figure 12A:
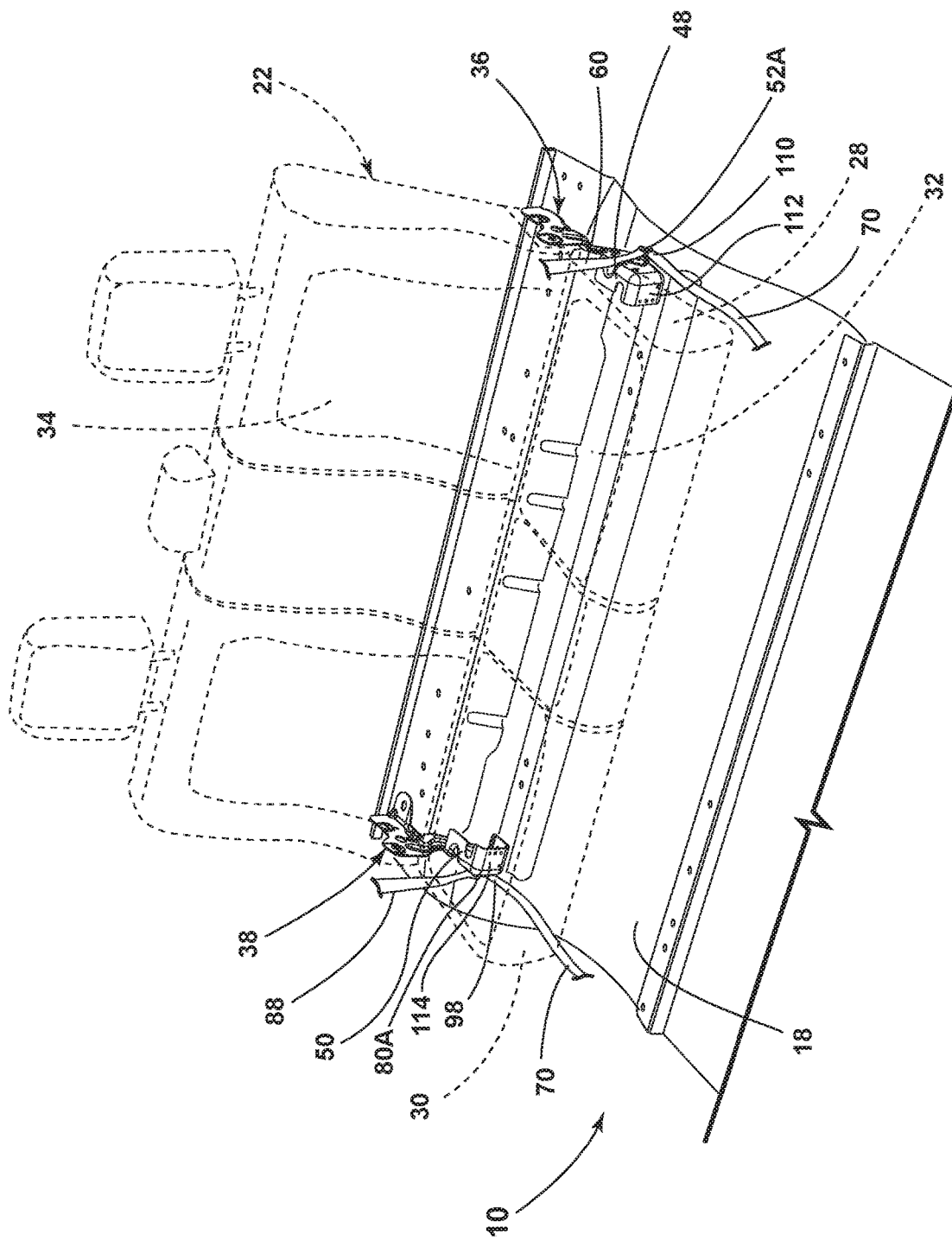
FIG. 12A is a perspective view of the second row of seating of FIG. 1, illustrating an alternative embodiment of the first anchor bracket attached to the first riser.
Figure 12B:
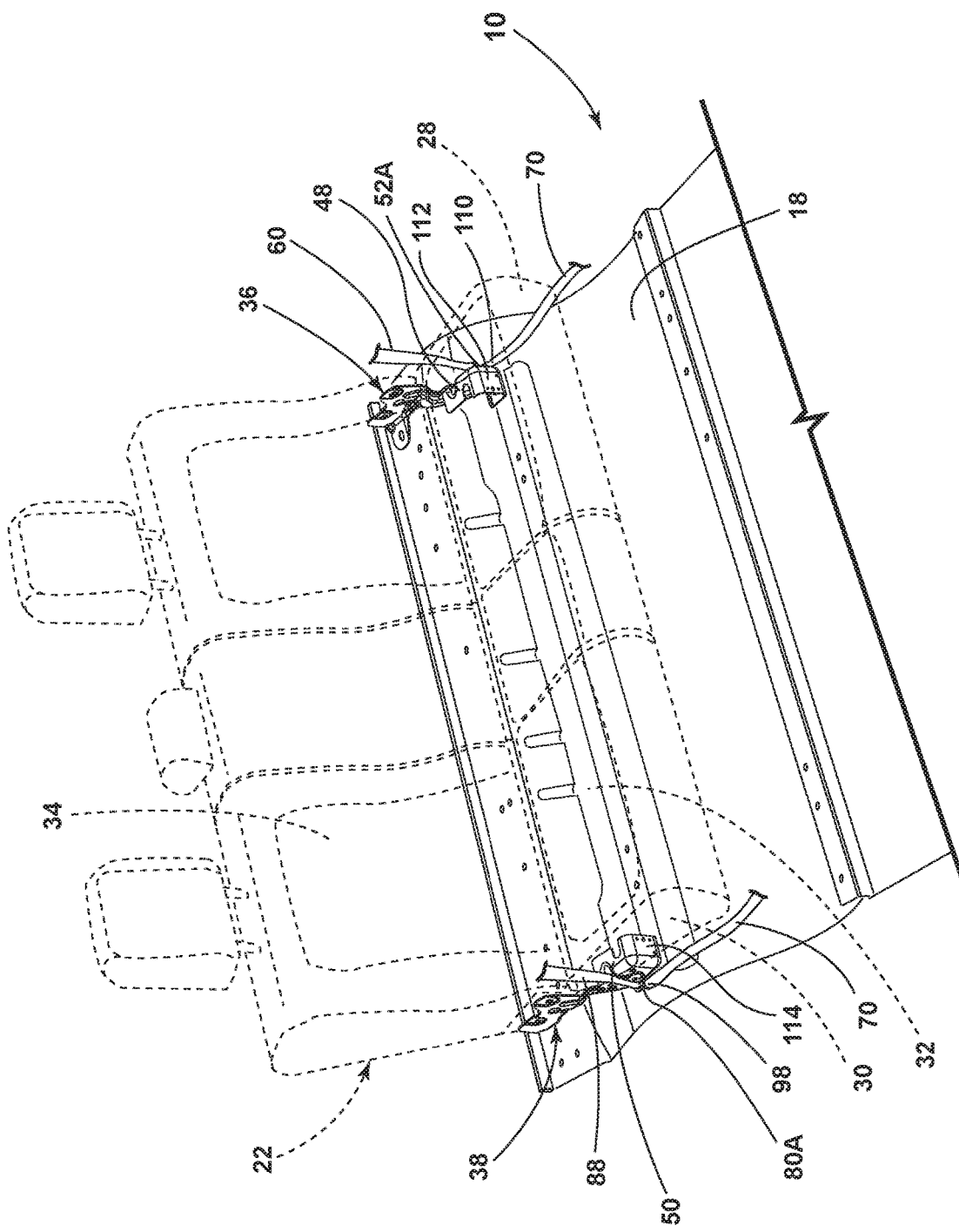
FIG. 12B is a perspective view of the second row of seating of FIG. 1, illustrating an alternative embodiment of the second anchor bracket attached to the second riser.

The second anchor bracket 80 further includes a cargo securement attachment portion 92 (see particularly FIGS. 9 and 10). The cargo securement attachment portion 92 can include an aperture 94 and an arm 96. The cargo securement device 70, a second end 98 thereof, can be attached to the cargo securement attachment portion 92.

In the illustrated embodiments, the second anchor bracket 80 is connected to the second riser 38. Like the first anchor bracket 52, the second anchor bracket 80 can include a support attachment section 100. The support attachment section 100 can be generally flat or otherwise matching the contour of the second riser 38 where the support attachment section 100 is attached. The support attachment section 100 includes apertures 102, which can match apertures 104 (see FIG. 8) on the second riser 38, allowing fasteners (not illustrated) to connect the second anchor bracket 80 to the second riser 38 via the apertures 102 and the matching apertures 104 of the second riser 38. The seatbelt webbing attachment portion 82 and the cargo securement attachment portion 92 extend from the support attachment section 100. The seatbelt webbing attachment portion 82 and the cargo securement attachment portion 92 can extend outboard laterally from the support attachment section 100, including generally orthogonally therefrom, as illustrated (see, e.g., FIG. 10).

As illustrated by comparing FIG. 7 with FIG. 10, the first anchor bracket 52 and the second anchor bracket 80 can be identically shaped. For example, as illustrated particularly in FIG. 11, the seatbelt webbing attachment portion 54 of the first anchor bracket 52 generally opposes the cargo securement attachment portion 64, and extends from the opposite side of the support attachment section 74 as the cargo securement attachment portion 64. More particularly, the seatbelt webbing attachment portion 54 can include an inside facing surface 106, and the cargo securement attachment portion 64 can include an inside facing surface 108. The inside facing surfaces 106, 108 can form parallel planes. Likewise, as the second anchor bracket 80 is identical in an embodiment to the first anchor bracket 52, the seatbelt webbing attachment portion 82 of the second anchor bracket 80 generally opposes the cargo securement attachment portion 92. The identical shape of the first anchor bracket 52 and the second anchor bracket 80 allows for the production of both the first anchor bracket 52 and the second anchor bracket 80 using one stamp or mold and for the respective first and second anchor brackets 52, 80 to be interchangeable during assembly of the vehicle 10.

Figure 13:
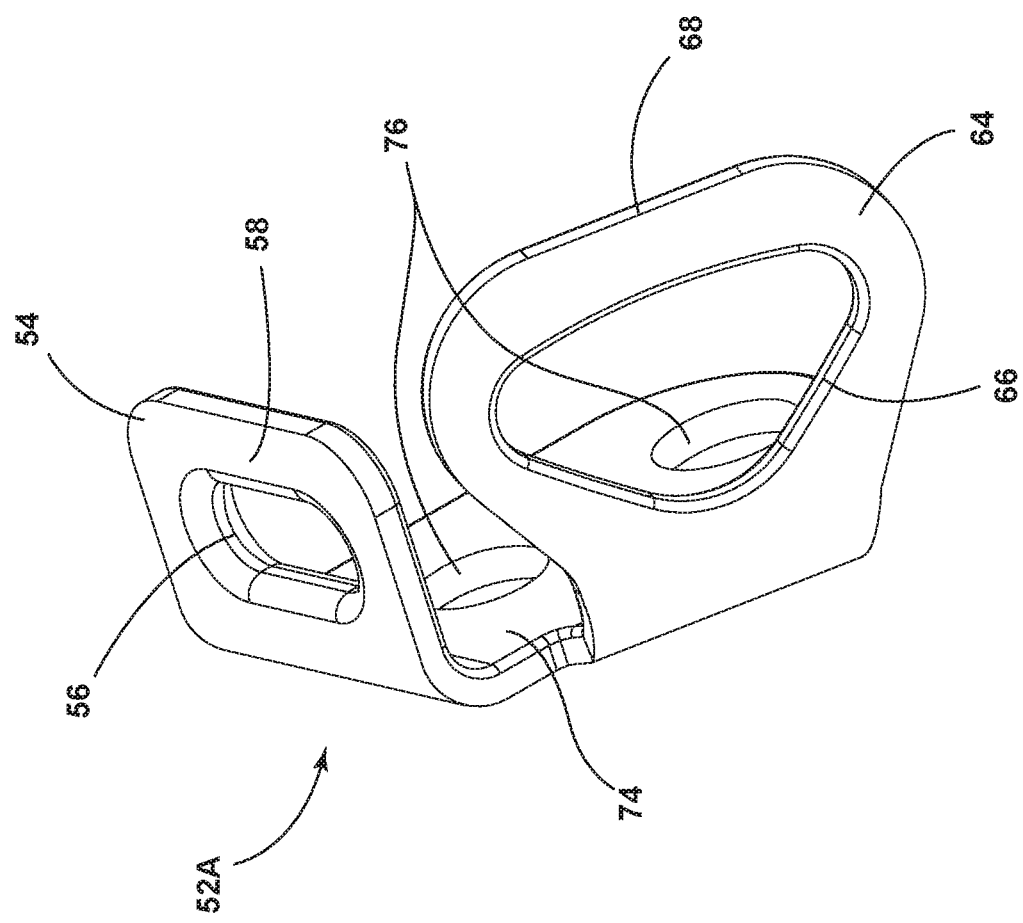
FIG. 13 is a perspective view of the alternative first anchor bracket of FIG. 12A, illustrating the cargo securement attachment portion and the seatbelt webbing attachment portion both extending from the support attachment portion but not opposing each other.
Figure 14:
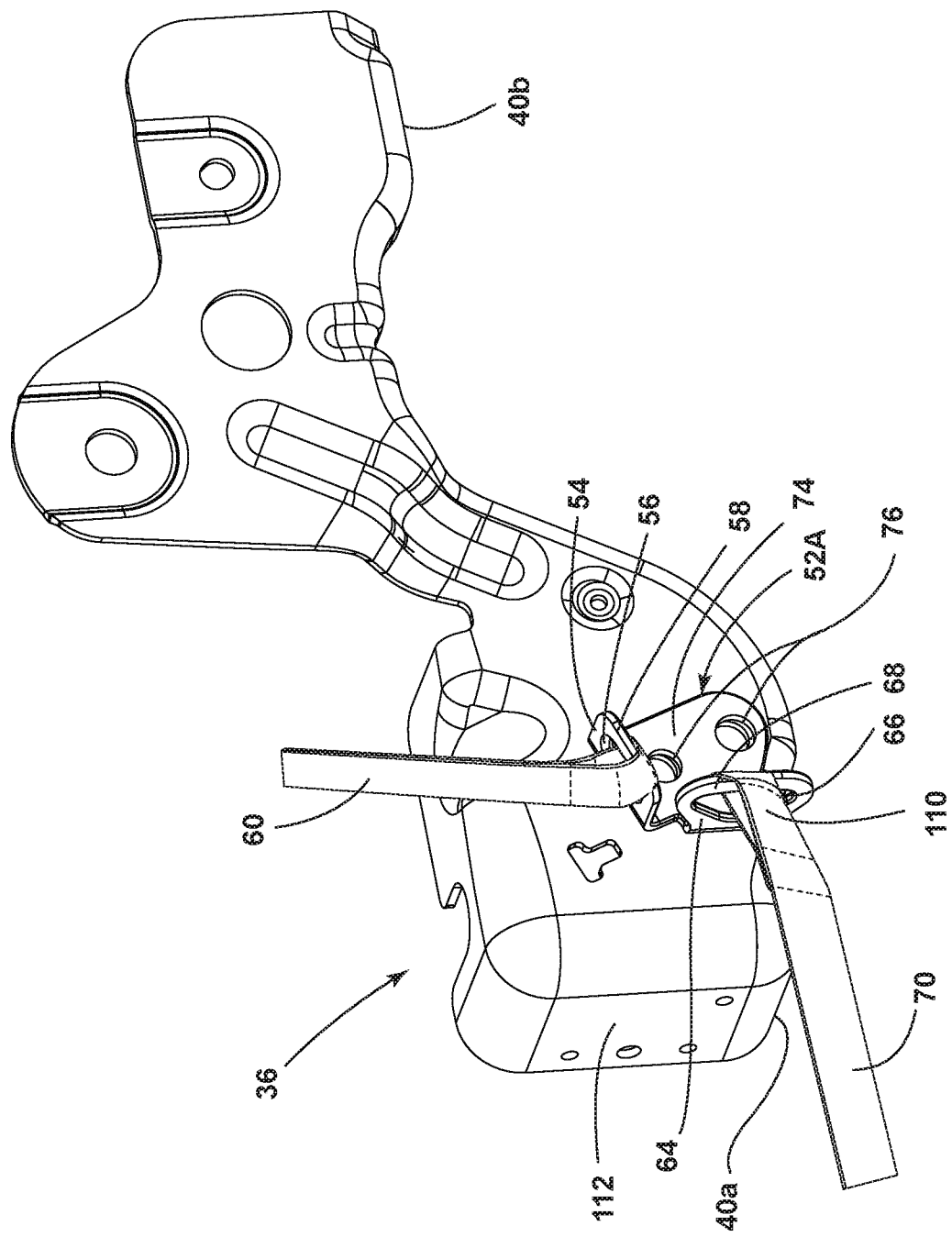
FIG. 14 is a perspective view of the first riser of FIG. 12A, illustrating the alternative first anchor bracket attached thereto, and the first seatbelt webbing and the cargo securement device both attached to the alternative first anchor bracket.

Referring now particularly to FIGS. 12A, 12B, 13, and 14, in another embodiment, a first anchor bracket 52A and a second anchor bracket 80A can be shaped differently and thus not interchangeable. For example, as illustrated in FIG. 13, the first anchor bracket 52A can include a seatbelt webbing attachment portion 54 extending from a support attachment section 74 in the same manner as the first anchor bracket 52. However, unlike the first anchor bracket 52, the cargo securement attachment portion 64 of the first anchor bracket 52A extends from the support attachment section 74 forward of the seatbelt webbing attachment portion 54, which is particularly well illustrated in FIG. 14. For example, the cargo securement attachment portion 64 can be disposed closer to the forward end 112 of the first riser 36 than the seatbelt webbing attachment portion 54, when the first anchor bracket 52A is attached thereto. The first anchor bracket 52A is otherwise identical to the first anchor bracket 52. The seatbelt webbing attachment portion 54 includes an arm 58 and an aperture 56, the cargo securement attachment portion 64 includes an arm 68 and an aperture 66, and the support attachment section 74 includes apertures 76, as before.

Figure 15:
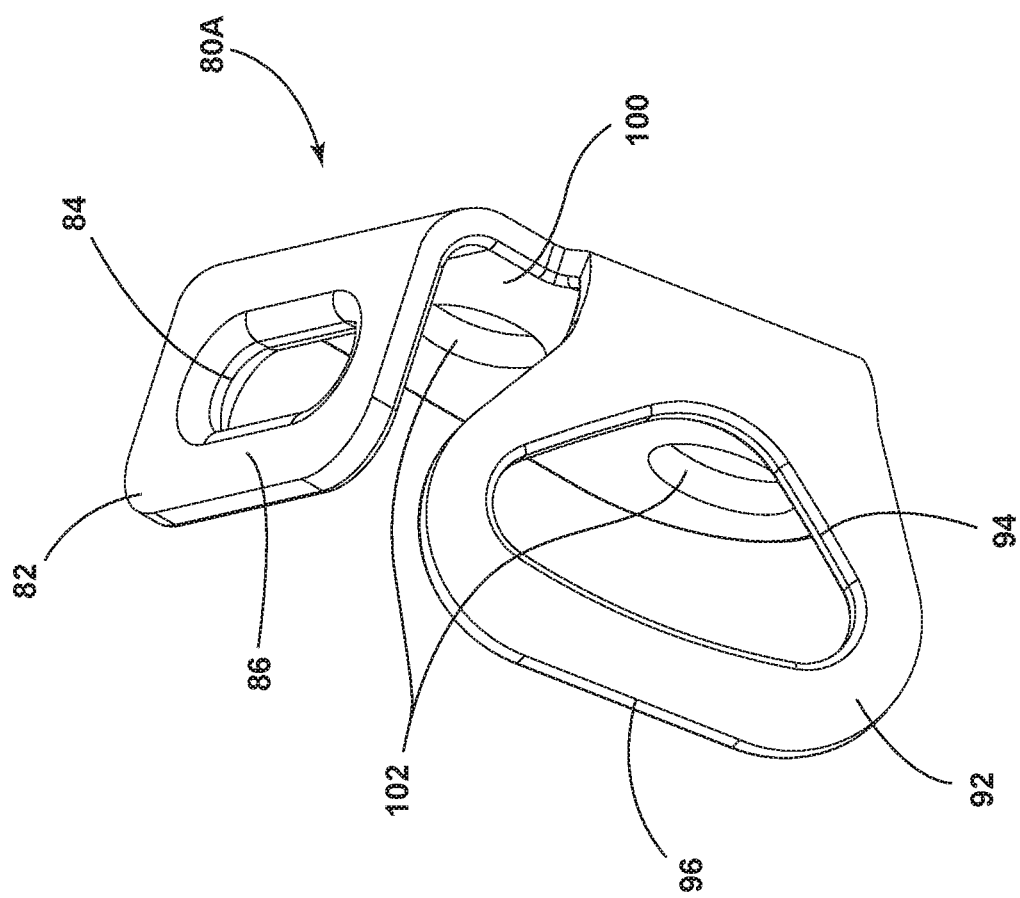
FIG. 15 is a perspective view of the alternative second anchor bracket of FIG. 12B, illustrating the cargo securement attachment portion and the seatbelt webbing attachment portion both extending from the support attachment portion but not opposing each other.
Figure 16:
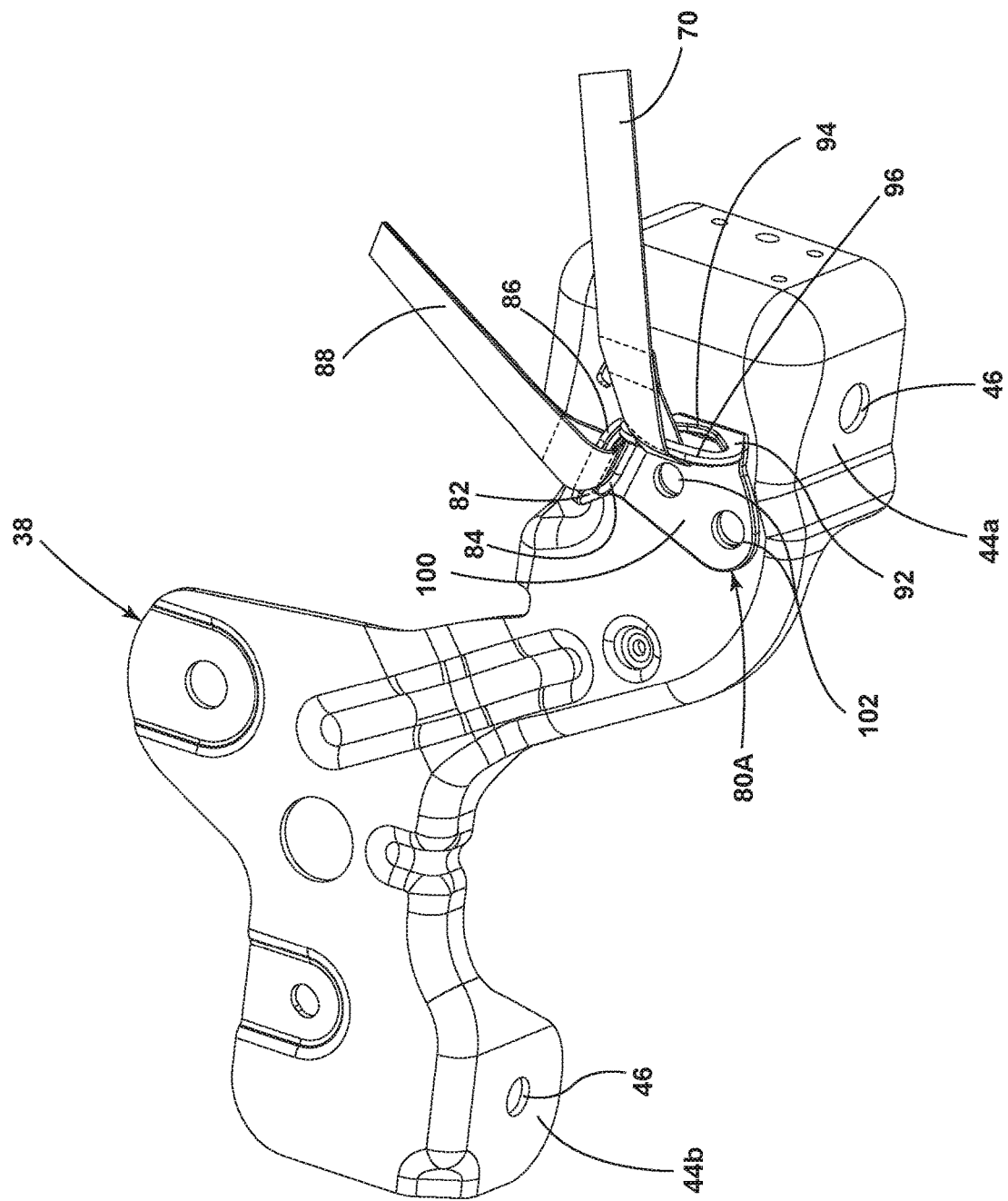
FIG. 16 is a perspective view of the second riser of FIG. 12B, illustrating the alternative second anchor bracket attached thereto, and the second seatbelt webbing and the cargo securement device both attached to the alternative second anchor bracket.
Figure 17:
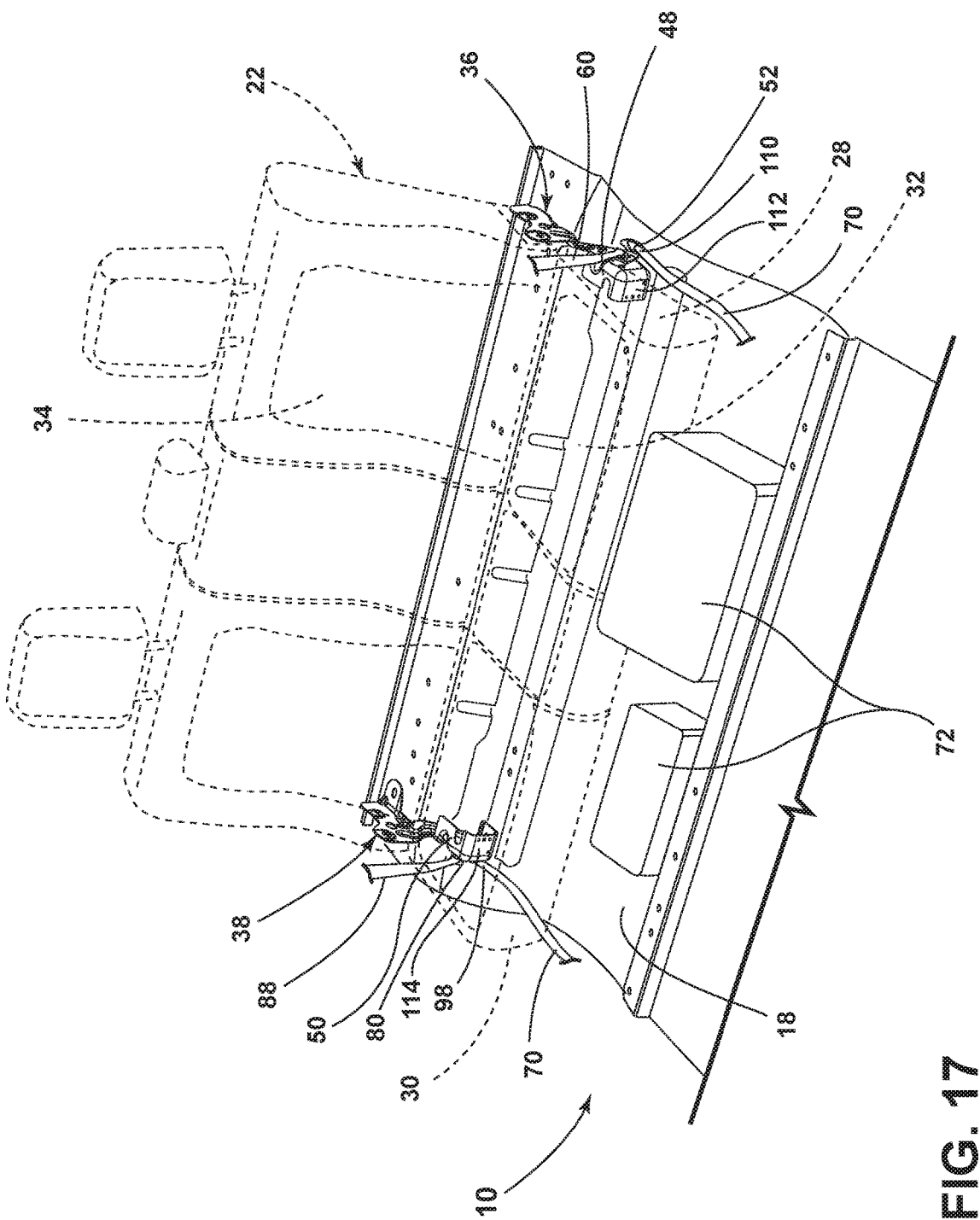
FIG. 17 is a perspective view of second row of seating of FIG. 1, with several pieces of cargo disposed on the floor portion adjacent the second row of seating.
Figure 18:
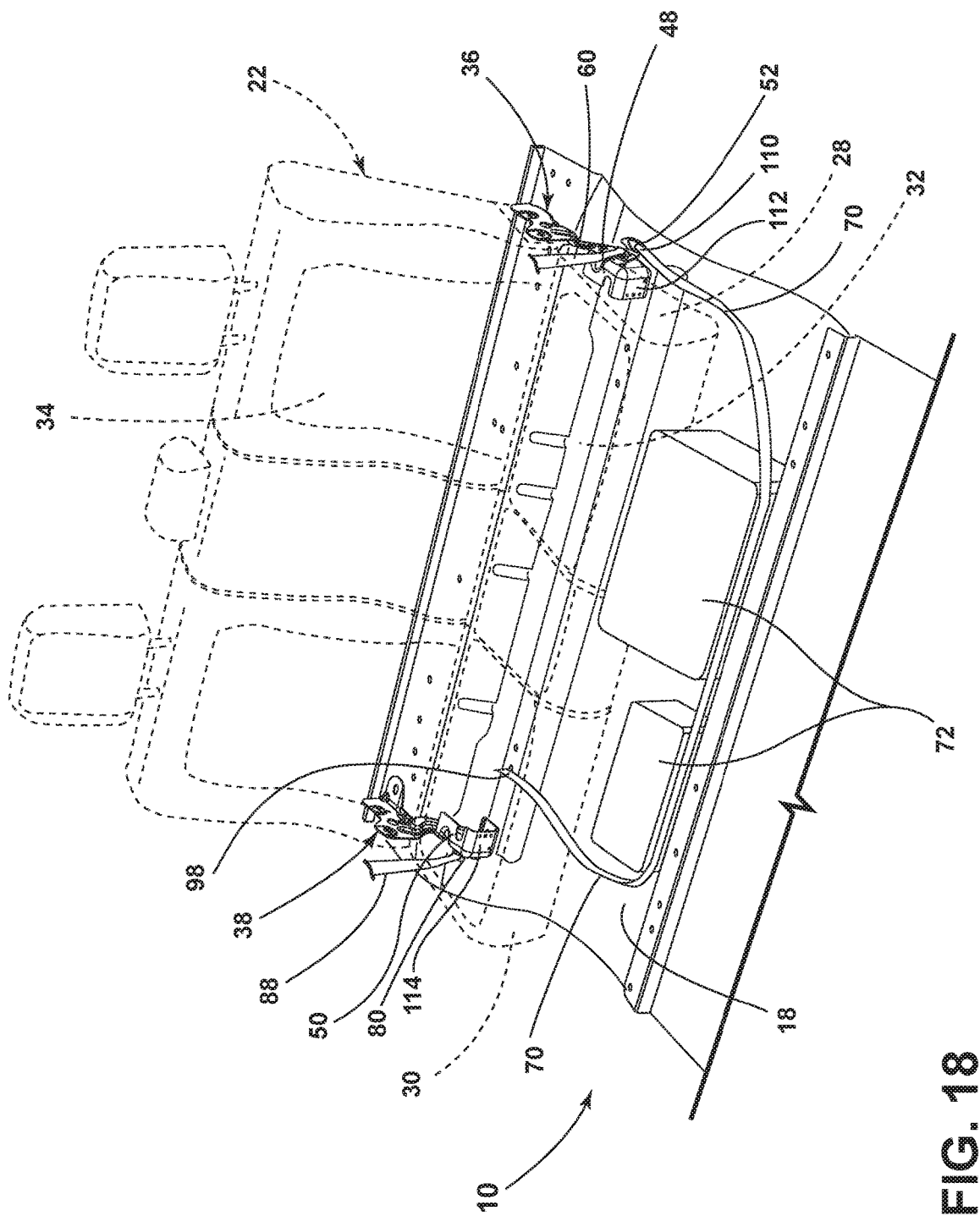
FIG. 18 is a perspective view of FIG. 17, further illustrating the cargo securement device, attached at a first end to the cargo securement attachment portion of the first anchor bracket, attached at a second end elsewhere adjacent the second row of seating, and securing the pieces of cargo above the floor portion.

Similarly, as illustrated in FIG. 15, the second anchor bracket 80A can include a seatbelt webbing attachment portion 82 extending from a support attachment section 100 in the same manner as the second anchor bracket 80. However, unlike the second anchor bracket 80, the cargo securement attachment portion 92 of the second anchor bracket 80A extends from the support attachment section 100 forward of the seatbelt webbing attachment portion 82, which is particularly well illustrated in FIG. 16. For example, the cargo securement attachment portion 92 can be disposed closer to the forward end 114 of the second riser 38 than the seatbelt webbing attachment portion 82, when the second anchor bracket 80A is attached thereto. The second anchor bracket 80A is otherwise identical to the second anchor bracket 80. The seatbelt webbing attachment portion 82 includes an arm 86 and an aperture 84, the cargo securement attachment portion 92 includes an arm 96 and an aperture 94, and the support attachment section 100 includes apertures 102, as before.

The vehicle 10 described above, incorporating the first anchor bracket 52 and the second anchor bracket 80, or the alternative embodiment first anchor bracket 52A and second anchor bracket 80A, can be utilized in a novel method of securing one or more pieces of cargo 72 on the floor portion 18 of the vehicle 10. Referring now to FIGS. 17-20, the novel method includes presenting the vehicle 10 described above and placing one or more pieces of cargo 72 above the floor portion 18 adjacent the second row of seating 22 (see particularly FIG. 17). The method further includes securing the cargo securement device 70, adjacent the one or more pieces of cargo 72, to restrain movement of the one or more pieces of cargo 72 while the vehicle 10 is moving (see particularly FIG. 18). In many instances, the cargo securement device 70 can be secured forward of the one or more pieces of cargo 72 (as in FIG. 18), to prevent the forward movement of the one or more pieces of cargo 72 while the vehicle 10 is moving. Note that a first end 110 of the cargo securement device 70 can be attached to the cargo securement attachment portion 64 of the first anchor bracket 52 (or 52A), without attaching a second end 98 of the cargo securement device 70 to the second anchor bracket 80 (or 80A). Indeed, the vehicle 10 may not even include the second anchor bracket 80 (or 80A), and the second end 98 of the cargo securement device 70 can be attached elsewhere, such at a location on the second row of seating 22 between the first side 28 and the second side 30 or at a location on the floor portion 18 (see particularly FIG. 18). The method further includes moving the vehicle 10. Despite the movement of the vehicle 10, the cargo securement device 70 maintains the one or more pieces of cargo 72 at their place above the floor portion 18 adjacent the second row of seating 22.

Figure 19:
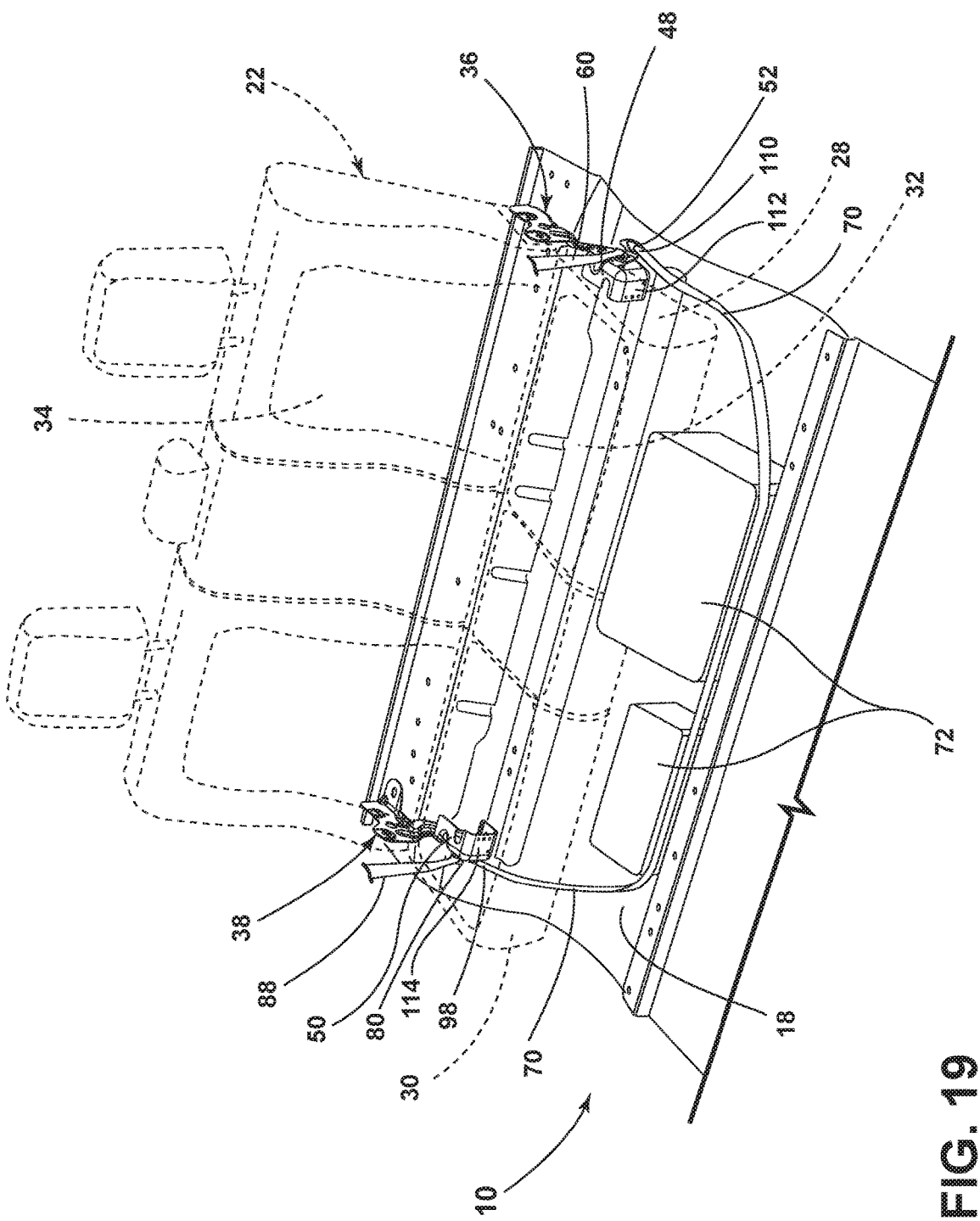
FIG. 19 is a perspective view of FIG. 17, further illustrating the cargo securement device, attached at the first end to the cargo securement attachment portion of the first anchor bracket, attached at the second end to the cargo securement attachment portion of the second anchor bracket, and securing the pieces of cargo above the floor portion.

In the event the vehicle 10 includes the second anchor bracket 80 (or 80A) to which the cargo securement device 70 is attached, then the cargo securement device 70 can extend from the first anchor bracket 52 (or 52A) to the second anchor bracket 80 or 80A, as illustrated in FIG. 19. For example, the first end 110 of the cargo securement device 70 can be attached to the first anchor bracket 52 (or 52A) and the second end 98 of the cargo securement device 70 can be attached to the second anchor bracket 80 (or 80A).

Figure 20:
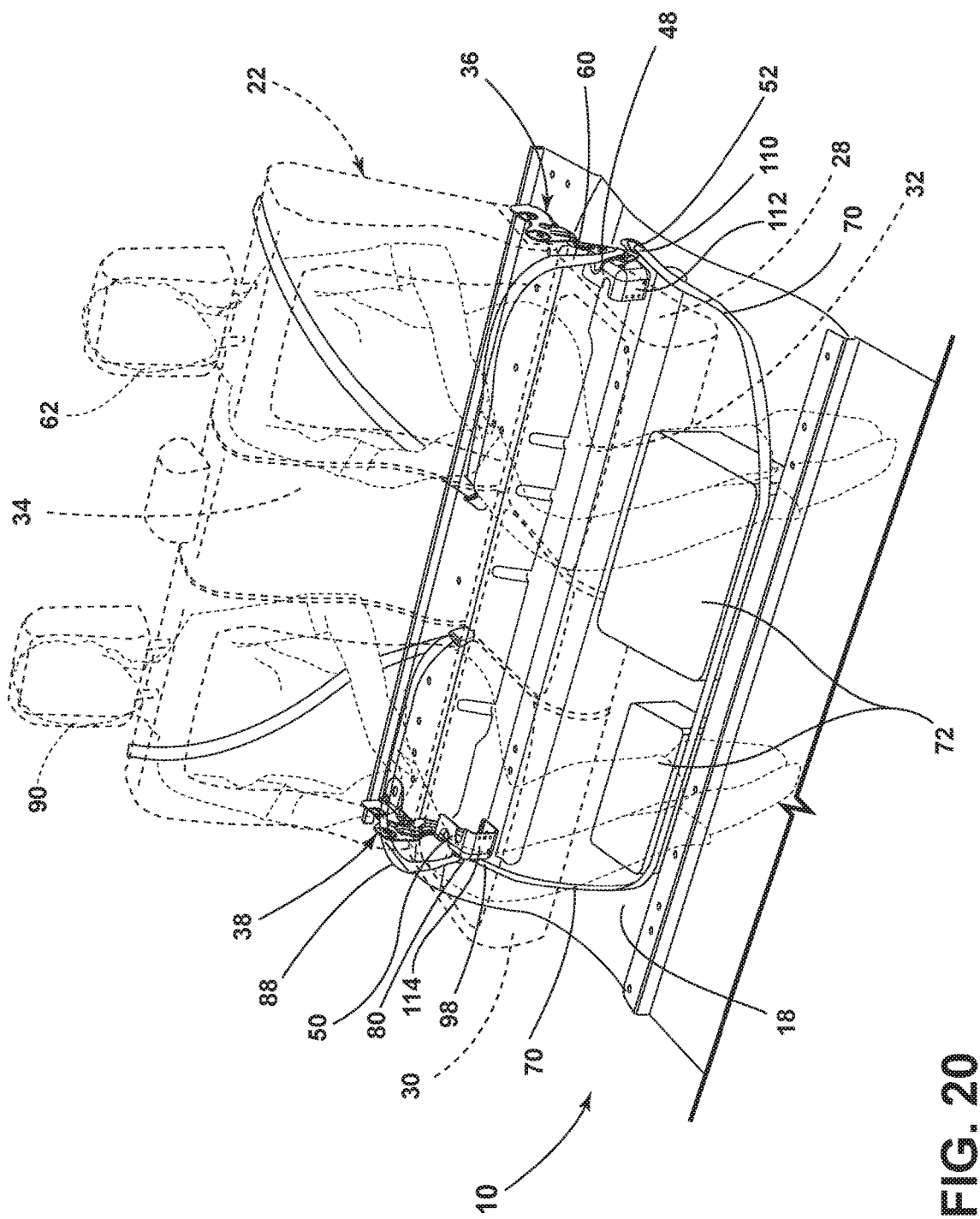
FIG. 20 is a perspective view of FIG. 19, further illustrating the first seatbelt webbing attached to the seatbelt webbing attachment portion of the first anchor bracket securing an occupant to the second row of seating, and the second seatbelt webbing attached to the seatbelt webbing attachment portion of the second anchor bracket securing another occupant to the second row of seating.

Referring now to FIG. 20, the method can further include securing the occupant 62 on the second row of seating 22 with the first seatbelt webbing 60, which is attached to the first anchor bracket 52 (or 52A), such as to a seatbelt webbing attachment portion 54 thereof. As illustrated, the first anchor bracket 52 (or 52A) provides structural support for both the first seatbelt webbing 60 and the cargo securement device 70. The first seatbelt webbing 60 attached to the first anchor bracket 52 (or 52A) can be utilized to secure the occupant 62 to the second row of seating 22. Simultaneously, the cargo securement device 70, also attached to the first anchor bracket 52 (or 52A), can be utilized to secure the one or more pieces of cargo 72 above the floor portion 18 adjacent the second row of seating 22. Note also, as illustrated in FIG. 20, that the second anchor bracket 80 (or 80A) can simultaneously serve as the attachment point for the second end 98 of the cargo securement device 70 and the second seatbelt webbing 88, which can be securing another occupant 90 to the second row of seating.

Similarly, the method can further include unsecuring the one or more pieces of cargo 72, such as by altering the location of the cargo securement device 70, and removing the one or more pieces of cargo 72 from the vehicle 10 before securing the occupant 62 to the second row of seating 22. This highlights the dual nature of the first anchor bracket 52 (or 52A) as the attachment point for both the cargo securement device 70 and the first seatbelt webbing 60, which could be used for their respective purposes sequentially or simultaneously.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle comprising:
   a floor portion;
   a row of seating including a first side and a second side; and
   a first anchor bracket disposed adjacent the first side of the row of seating including:
      a seatbelt webbing attachment portion to which a first seatbelt webbing, configured to secure an occupant to the row of seating, is attached; and
      a cargo securement attachment portion to which a cargo securement device, configured to secure one or more pieces of cargo above the floor portion adjacent the row of seating, is attached.

2. The vehicle of claim 1 further comprising:
   a second anchor bracket disposed adjacent the second side of the row of seating including:
      a seatbelt webbing attachment portion to which a second seatbelt webbing, configured to secure an occupant to the row of seating, is attached; and
      a cargo securement attachment portion to which the cargo securement device is attached.

3. The vehicle of claim 2,
   the row of seating including a seat portion and a seatback portion;
   wherein, the first anchor bracket is disposed adjacent the seat portion at the first side of the row of seating; and
   wherein, the second anchor bracket is disposed adjacent the seat portion at the second side of the row of seating.

4. The vehicle of claim 3 further comprising:
   a first riser attached to the floor portion and disposed beneath the seat portion, at the first side of the row of seating, elevating the seat portion above the floor portion; and
   a second riser attached to the floor portion and disposed beneath the seat portion, at the second side of the row of seating, elevating the seat portion above the floor portion;
   wherein, the first anchor bracket is connected to the first riser; and
   wherein, the second anchor bracket is connected to the second riser.

5. The vehicle of claim 4,
   the first anchor bracket comprising a support attachment section including one or more apertures, configured to allow one or more fasteners to project through the one or more apertures and one or more matching apertures of the first riser to allow connection of the first anchor bracket to the first riser; and
   the second anchor bracket comprising a support attachment section including one or more apertures, configured to allow one or more fasteners to project through the one or more apertures and one or more matching apertures of the second riser to allow connection of the second anchor bracket to the second riser.

6. The vehicle of claim 5,
   wherein, the seatbelt webbing attachment portion and the cargo securement attachment portion of the first anchor bracket extend from the support attachment section of the first anchor bracket; and
   wherein, the seatbelt webbing attachment portion and the cargo securement attachment portion of the second anchor bracket extend from the support attachment section of the second anchor bracket.

7. The vehicle of claim 6,
   wherein, the first anchor bracket and the second anchor bracket are identically shaped.

8. The vehicle of claim 6,
   wherein, the first anchor bracket and the second anchor bracket are shaped differently and are not interchangeable.

9. The vehicle of claim 7,
   wherein, the seatbelt webbing attachment portion and the cargo securement attachment portion of the first anchor bracket extend generally orthogonally from the support attachment section; and
   wherein, the seatbelt webbing attachment portion and the cargo securement attachment portion of the second anchor bracket extend generally orthogonally from the support attachment section.

10. The vehicle of claim 8,
    wherein, the seatbelt webbing attachment portion and the cargo securement attachment portion of the first anchor bracket extend generally orthogonally from the support attachment section; and
    wherein, the seatbelt webbing attachment portion and the cargo securement attachment portion of the second anchor bracket extend generally orthogonally from the support attachment section.

11. The vehicle of claim 9,
    wherein, the seatbelt webbing attachment portion of the first anchor bracket generally opposes the cargo securement attachment portion; and
    wherein, the seatbelt webbing attachment portion of the second anchor bracket generally opposes the cargo securement attachment portion.

12. The vehicle of claim 10,
    wherein, the cargo securement attachment portion of the first anchor bracket is disposed forward of the seatbelt webbing attachment portion; and
    wherein, the cargo securement attachment portion of the second anchor bracket is disposed forward of the seatbelt webbing attachment portion.

13. A method of securing cargo on a floor portion of a vehicle comprising:
    presenting a vehicle comprising:
       a floor portion;
       a row of seating; and
       a first anchor bracket including:
          a seatbelt webbing attachment portion to which a first seatbelt webbing, configured to secure an occupant to the row of seating, is attached; and
          a cargo securement attachment portion to which a cargo securement device, configured to secure one or more pieces of cargo above the floor portion adjacent the row of seating, is attached;
    placing one or more pieces of cargo above the floor portion adjacent the row of seating;
    securing the cargo securement device adjacent the one or more pieces of cargo to restrain movement of the one or more pieces of cargo while the vehicle is moving; and
    moving the vehicle.

14. The method of claim 13,
    the vehicle further comprising:
       a second anchor bracket including:
          a seatbelt webbing attachment portion to which a second seatbelt webbing, configured to secure an occupant to the row of seating, is attached; and
          a cargo securement attachment portion to which the cargo securement device is attached;
       wherein, the row of seating includes a first side and a second side; and wherein, the first anchor bracket is disposed adjacent the first side of the row of seating and the second anchor bracket is disposed adjacent the second side of the row of seating.

15. The method of claim 14,
the row of seating including a seat portion and a seatback portion;
wherein, the first anchor bracket is disposed adjacent the seat portion at the first side of the row of seating; and
wherein, the second anchor bracket is disposed adjacent the seat portion at the second side of the row of seating.

16. The method of claim 15,
wherein, the first anchor bracket and the second anchor bracket are identically shaped.

17. The method of claim 15,
wherein, the first anchor bracket and the second anchor bracket are shaped differently and are not interchangeable;
wherein, the cargo securement attachment portion of the first anchor bracket is disposed forward of the seatbelt webbing attachment portion; and
wherein, the cargo securement attachment portion of the second anchor bracket is disposed forward of the seatbelt webbing attachment portion.

18. The method of claim 13 further comprising:
securing an occupant on the row of seating with the first seatbelt webbing attached to the seatbelt webbing attachment portion of the first anchor bracket.

19. The method of claim 17 further comprising:
securing an occupant on the row of seating with the first seatbelt webbing attached to the seatbelt webbing attachment portion of the first anchor bracket.

20. The method of claim 18 further comprising:
unsecuring the one or more pieces of cargo and removing the one or more pieces of cargo from the vehicle before securing the occupant on the row of seating.

* * * * *